Dec. 9, 1969     B. F. VOLKEL     3,482,467
CONNECTING ROD
Filed Feb. 26, 1968
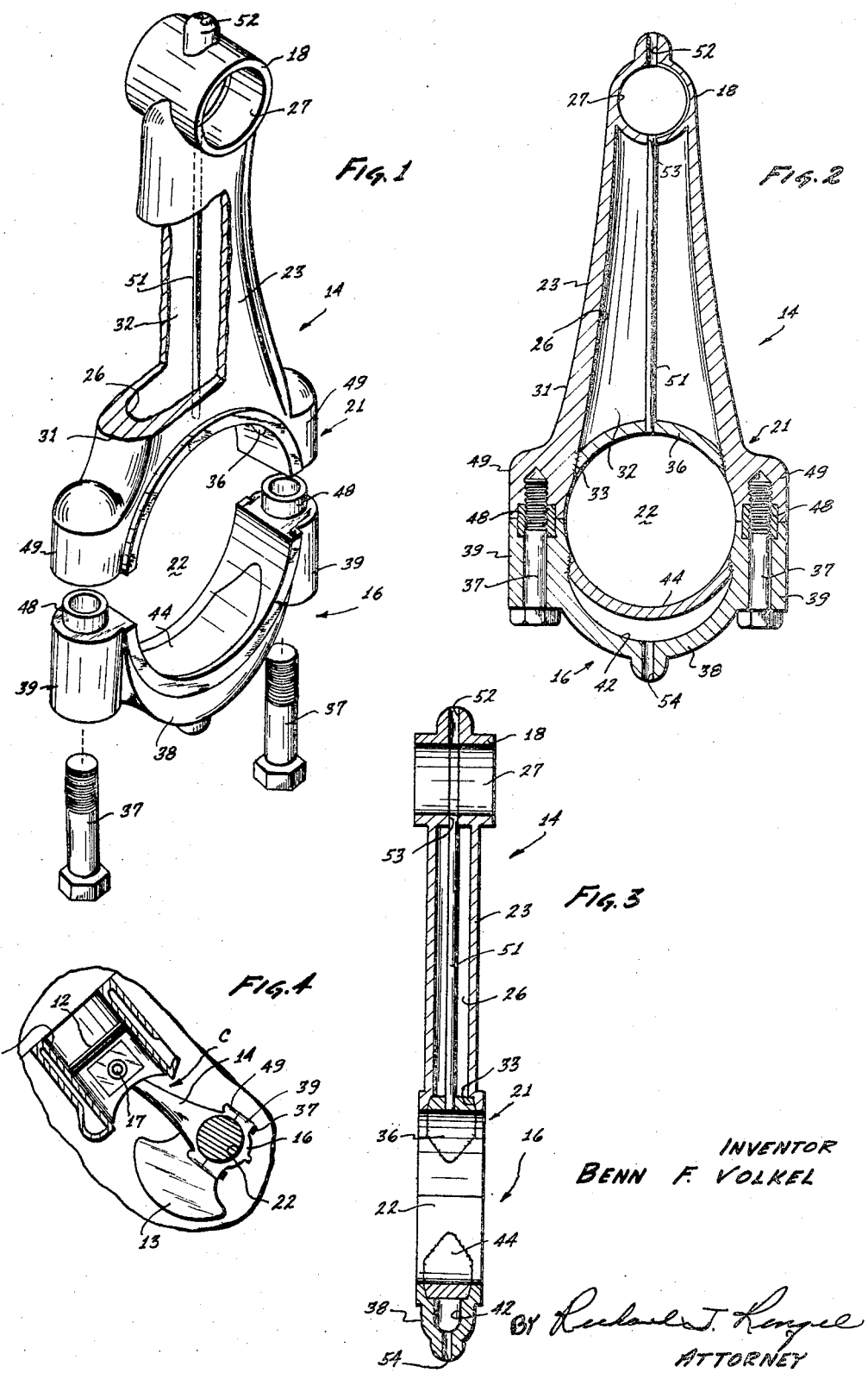
INVENTOR
BENN F. VOLKEL
By Richard T. Rengel
ATTORNEY United States Patent Office 3,482,467
Patented Dec. 9, 1969

3,482,467
CONNECTING ROD
Benn F. Volkel, 4343 Los Flores,
Lynwood, Calif. 90262
Filed Feb. 26, 1968, Ser. No. 708,084
Int. Cl. G05g 1/00
U.S. Cl. 74—579                         14 Claims

ABSTRACT OF THE DISCLOSURE

A connecting rod having a wrist-pin end and a crank-shaft fork-end with a tubiform midsection connecting the two ends and having a bearing cap which also has a tubiform cross section.

---

This invention relates to a connecting rod for reciprocating engines and, more particularly, to a connecting rod for use in high performance and high r.p.m. engines.

Engines as used in competitive racing require connecting rods that are light in weight and strong to withstand relative high forces and to minimize elastic distortions. Obviously the two requirements are not compatible whereby the prior art suggests many alternatives in connecting rod design. For example, the prior art suggests that connecting rods may have cylindrical tubes connecting the wrist-pin ends to the crank-shaft ends. This combination produces rods that are relatively strong in buckling and tension. However when one attempts to make efficient use of their tensile or buckling strength, the crank-shaft bores become elastically distorted, i.e., out of round, causing the connecting rods and bearings to fail.

An object of this invention is to provide a lightweight, strong, rigid connecting rod for high performance and high r.p.m. (revolutions per minute) reciprocating engines.

Another object is to produce a connecting rod with an improved tubiform midsection that is stronger and lighter.

Another object is to produce a bearing cap with a tubiform cross section to provide strength and rigidity with lightness in weight.

Another object is to provide a hollow midsection for a connecting rod and a hollow bearing cap whereby the hollow spaces could be filled with a light element such as sodium, that is liquid at normal engine operating temperature, to improve rod bearing and piston cooling.

The sodium filling, for example, is important in that it provides for dissipating the heat from rod bearing and piston at high operating pressure and temperatures while being light in weight.

The foregoing and other objects, advantages and characterizing features of this invention will become apparent from the ensuing detailed description of the illustrative embodiment thereof, reference being made to the accompanying drawing wherein:

FIG. 1 is a pictorial view of the connecting rod with a portion broken away to show the tubiform midsection;

FIG. 2 is a sectional front view of the connecting rod;

FIG. 3 is an end elevation of the connecting rod showing a section taken on the centerline; and FIG. 4 shows the connecting rod installed in a typical reciprocating engine.

Referring first to FIG. 4 of the drawing, a portion of a typical reciprocating V-8 engine is schematically shown. The engine has a cylinder wall 11 in which is mounted a piston 12 in slideable relationship therewith. The piston 12 is connected to a crank-shaft 13 by the novel connecting rod 14. A suitable wrist pin 17 is used to connect the rod 14 to the piston in a manner well known in the art.

Referring to FIGS. 1, 2 and 3, the novel connecting rod 14 is shown in greater detail. The rod 14 has a cylindrical tubular wrist pin end 18 wherein the wrist pin 17 is inserted in a bore 27. At the other end of the rod 14 is formed a circular bore 22 by a fork-end 21 and a bearing cap 16. The crank-shaft 13 passes through the bore 22. The wrist pin end 18 and the fork-end 21 are cast integral with a tubiform midsection 23, having for example an oval cross section that is symmetrical about an axis. In this application tubiform is an adjective that describes any tubular shape that includes but is not limited to a cylindrical tube. As shown in FIG. 2, the tubiform midsection 23 has a silhouette forming substantially a regular trapezoid when viewed from the front, and as shown in FIG. 3, it has a substantially rectangular silhouette, i.e., the vertical edges are substantially parallel. This configuration for the midsection 23 produces a rod with substantially more strength and less weight than prior art connecting rods.

The trapezoidal silhouette of the tubiform midsection 23, as viewed from the front (FIG. 2), is preferably determined by striking an arc 26 that is preferably a circular arc and that is tangent to the bore 27 and tangent to the bore 22. This arc 26 determines the periphery of the inner surface of the oval cross section as viewed in FIG. 2. The periphery of the outer surface is determined by another circular arc 31 spaced from the arc 26. The distance between the arcs 26 and 31 near the end 18 is preferably no less than the thickness of the tubular wall of the end 18. Near the crank-shaft bore 22, the thickness of distance between arcs 26 and 31 is made as large as possible and is limited by the required clearance C (FIG. 4) between the cylinder wall 11 and the rod 14 as the piston 12 slides within wall 11. Thus a rod is produced wherein the section modulus increases as one takes a section, normal to the rod axis, further and further away from the wrist pin end 18. In addition a well 32 is formed in the rod 14 which well 32 increases in cross sectional area also as the cross sectional areas are taken further and further away from the end 18. This feature allows the rod 14 to be readily cast.

For rods which have a relatively large distance between the wrist pin end and the crank-shaft end, instead of arc 26, an arc should be drawn that is tangent to a line that is substantially parallel to the rod axis and that is tangent to the bore 27. The portion of the well from the tangent point to the wrist pin end would have a substantially uniform cross sectional area. However a slight taper would be provided in order to cast the rod as will become apparent hereinafter.

Since the arc 31 is chosen to provide the required clearance C, the thickness of the tubiform midsection 23 near the fork-end 21 is as large as possible to provide the maximum possible rigidity thereat in the lateral direction, i.e., in a plane that is normal to the rod axis and passes through the centerline of the bore 22. This feature of the novel rod will be more fully explained hereinafter.

Since the novel rod 14 has a wrist pin end 18 and a fork-end 21 integrally connected to the tubiform midsection 23, the rod preferably is cast by using the "investment" casting method or, also known, as the "lost-wax" process. Also, "shell mold" or "shell casting" process can be used. As mentioned above, the well 32 in the rod has a cross sectional area (i.e., the area normal to the rod axis) which area increases from the closed end to the opening 33. In addition the section modulus increases as sections are taken closer and closer to the fork-end 21. The opening 33 being disposed in the fork-end 21 where the bearing surface for the crank-shaft is located. The opening 33 is closed with an insert 36 (a casting) welded to the periphery of the opening 33 to provide additional lateral strength and bearing surface. The bearing cap 16 also has a hollow interior or a well 42 and is cast in a similar manner. The hollow construction produces a cap with extreme rigidity in the region between bolts 37. In this region the cap 16 has an arch member 38 disposed between two bolt lugs 39. The arch member is arched in two directions so that the edges thereof terminate at the bore 22, providing the well 42 therein. The opening of the well 42 is closed with a cap insert 44 arc welded in place (e.g., heli-arc welding).

Lateral rigidity in the novel rod substantially prevents the center-to-center distance between the bolts 37 from decreasing when the rod is subjected to maximum operating tensile forces. In one application the novel rod, which was designed to be used in a V–8 engine of the 327 cubic inch class, maintained the center-to-center bolt distance to within .0005 of an inch when subjected to a tensil force of 7,000 pounds. The rod withstood a tensile force of over 36,000 pounds before the fixture bolts failed (not the rod bolts 37). In order to provide mutual support between the fork-end 21 and the bearing cap 16, shear sleeves 48 are provided between each leg 49 of the fork-end 21 and the corresponding bolt lug 39 on the bearing cap 16 as shown in FIGURES 1 and 2. The sleeves 48 are, for example, press fitted into the cap 16 around each bolt hole and form a snug fit with suitable recesses that are provided in the legs 49 of the fork-end 21.

In some applications forced oiling may be required. Then an oil tube 51 could be inserted as shown on the axis. A hole 52 in end 18 could be used to spray oil on the piston 12 to cool the underside of the piston top. Another function of the hole 52 and another hole 53 is to center a core member (not shown) used in the casting process. Bearing cap 16 has a hole 54 which is also required to cast the item. In addition the wells 32 and 42 may be filled with sodium in a convenient manner through the casting holes and the holes then sealed so that heat may be readily conducted from the bearing inserts.

Other various modifications and variations of the present invention are contemplated that would become apparent to those skilled in the art without departing from the spirit and scope of the invention. Therefore, the invention is not limited to the exemplary apparatus or procedures described but includes all embodiments within the scope of the claims.

I claim:
1. A connecting rod for an engine comprising:
   a tubiform midsection symmetrical about an axis,
   a wrist-pin end disposed at one end of said tubiform midsection and having a first bore disposed normal to said axis,
   a crank-shaft end including a fork-end that is fixed to the tubiform midsection and including a bearing cap bolted to said fork-end forming a second bore parallel to the first bore,
   said tubiform midsection including first opposite walls with outer surfaces thereof disposed tangent to the outer surface of said wrist-pin end, and being shaped so that the regions of tangency are substantially opposite across the axis of said first bore, and
   said tubiform midsection having a greater section modulus near the crank-shaft end than the wrist-pin end.
2. The rod of claim 1 wherein: said tubiform midsection has a silhouette in one direction that is wider at one end than the other, and a silhouette in a second direction, normal to said one direction, which silhouette has a substantially uniform width.
3. The rod of claim 1 wherein:
   said bearing cap includes a tubiform section between opposite ends thereof.
4. The rod of claim 1 wherein said tubiform midsection has second opposite walls substantially parallel to said axis and has said first opposite walls each joining both parallel walls at the respective edges thereof.
5. The rod of claim 4 wherein each of said first walls has an arched inner surface that is tangent to both said first and second bores and said outer surfaces are arched and tangent to the outer surface of said wrist-pin and said outer surfaces are spaced from respective ones of said arched inner surfaces to provide sufficient clearance thereof from a respective cylinder wall of said engine.
6. The rod of claim 4 wherein:
   said tubiform midsection has a section modulus that gradually increases from said wrist-pin end to said crank-shaft end forming a first well wherein the area cross-section normal to said axis also gradually increases from said wrist-pin end to said crank-shaft end to form a first opening disposed to communicate with said second bore,
   a first insert disposed within said first opening and welded to the periphery of said first opening,
   said bearing cap including a tubiform arched section having bolt lugs formed on opposite ends thereof,
   said tubiform arched section having a wall which is arched in two directions forming a second well having a second opening disposed to communicate with said second bore,
   a second insert disposed within said second opening and welded to the periphery of said second opening.
7. The rod of claim 6 wherein each of said arched inner surfaces has a configuration such that a line, formed by the intersection of said arched inner surface and a plane normal to said first and second bores, is a portion of a circular arc.
8. The rod of claim 7 wherein said arched outer surface has a configuration such that a line formed by said outer surface and said plane is also a portion of a circular arc.
9. The rod of claim 6 wherein said first and second wells are filled with sodium.
10. The rod of claim 6 wherein an oil tube is disposed on said axis and communicates with both said first and second bores.
11. The rod of claim 6 wherein the gradually increasing area cross-section of said first well has a greater rate of increase near the periphery thereof than the adjacent region further into said first well to provide a support for said first insert.
12. The rod of claim 6 wherein said first opening has a shoulder wherein said first insert is disposed to provide rigidity to said first insert.
13. The rod of claim 12 wherein said second opening also has a shoulder wherein said second insert is disposed to provide rigidity to said second insert.
14. The rod of claim 13 wherein shear sleeves are disposed between said fork-end and said bearing cap to provide mutual support between the two members.

References Cited
UNITED STATES PATENTS

| 246,258 | 8/1881 | Westinghouse | 74—587 XR |
| 310,979 | 1/1885 | Bogert | 74—587 XR |
| 2,109,735 | 3/1938 | Rosen | 75—587 XR |

FOREIGN PATENTS 670,034  11/1929  France.

FRED C. MATTERN, Jr., Primary Examiner

F. D. SHOEMAKER, Assistant Examiner